(12) United States Patent
Huang et al.

(10) Patent No.: US 11,391,380 B2
(45) Date of Patent: Jul. 19, 2022

(54) WATER OUTLET VALVE ASSEMBLY AND HUMIDIFIER INCLUDING WATER OUTLET VALVE ASSEMBLY

(71) Applicant: Gree Electric Appliances, Inc. of Zhuhai, Guangdong (CN)

(72) Inventors: Zhongping Huang, Guangdong (CN); Jianfei Hou, Guangdong (CN); Jinbao Zhou, Guangdong (CN); Jianhua Zhang, Guangdong (CN); Xianle Mo, Guangdong (CN); Guoliang Li, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 0 days.

(21) Appl. No.: 17/047,116

(22) PCT Filed: Dec. 22, 2018

(86) PCT No.: PCT/CN2018/122927
§ 371 (c)(1),
(2) Date: Oct. 13, 2020

(87) PCT Pub. No.: WO2020/042479
PCT Pub. Date: Mar. 5, 2020

(65) Prior Publication Data
US 2021/0172532 A1    Jun. 10, 2021

(30) Foreign Application Priority Data
Aug. 27, 2018  (CN) .......................... 201810978845.6

(51) Int. Cl.
*F16K 1/36*    (2006.01)
*F16K 17/04*   (2006.01)

(52) U.S. Cl.
CPC ................ *F16K 1/36* (2013.01); *F16K 17/04* (2013.01)

(58) Field of Classification Search
CPC .................................... F16K 1/36; F16K 17/04
(Continued)

(56) References Cited

U.S. PATENT DOCUMENTS

| 8,523,144 B2* | 9/2013 | Pechtold | F16K 1/46 251/176 |
| 2003/0164559 A1 | 9/2003 | Rhea et al. | |
| 2013/0213497 A1* | 8/2013 | Helmsen et al. | F16K 1/36 137/533 |

FOREIGN PATENT DOCUMENTS

| CN | 85105795 A | 3/1987 |
| CN | 201502756 U | 6/2010 |

(Continued)

OTHER PUBLICATIONS

International Search Report, dated Jul. 12, 2017, in International application No. PCT/CN2017/079716, filed on Apr. 7, 2017.

*Primary Examiner* — Kevin L Lee
(74) *Attorney, Agent, or Firm* — McAndrews, Held & Malloy, Ltd.

(57) ABSTRACT

A water outlet valve assembly and a humidifier including the water outlet valve assembly are provided. The water outlet valve assembly is disposed at a water outlet of a water tank and includes a body and a pressure limiting portion. The body includes a housing and a valve core assembly. A flow passage is formed in the housing. The valve core assembly is capable of blocking the flow passage. The pressure limiting portion is disposed on the valve core assembly and applies a weight of the pressure limiting portion to the valve core assembly, and the pressure limiting portion provides the (Continued)

valve core assembly with a downward pre-tightening force, thus allowing the valve core assembly to block the flow passage.

14 Claims, 1 Drawing Sheet

(58) Field of Classification Search
USPC .......................................................... 251/144
See application file for complete search history.

(56) References Cited

FOREIGN PATENT DOCUMENTS

| | | |
|---|---|---|
| CN | 103267133 A | 8/2013 |
| CN | 203757004 U | 8/2014 |
| CN | 108105922 A | 6/2018 |
| CN | 207762312 U | 8/2018 |
| CN | 108799524 A | 11/2018 |
| JP | H0755046 A | 3/1995 |
| JP | H094884 A | 1/1997 |
| JP | 2000240825 A | 9/2000 |

* cited by examiner

WATER OUTLET VALVE ASSEMBLY AND HUMIDIFIER INCLUDING WATER OUTLET VALVE ASSEMBLY

CROSS REFERENCE TO RELATED APPLICATIONS

The present disclosure is a national stage application of International Patent Application No. PCT/CN2018/122927, which is filed on Dec. 22, 2018 and claims priority to Chinese Patent Priority No. 201810978845.6, filed to the National Intellectual Property Administration, PRC on Aug. 27, 2018, entitled "Water Outlet Valve Assembly and Humidifier Including Water Outlet Valve Assembly", the disclosure of which is hereby incorporated by reference in its entirety.

TECHNICAL FIELD

The disclosure relates to a related technical field of water outlet valves, and more particularly, to a water outlet valve assembly and a humidifier including the water outlet valve assembly.

BACKGROUND

Water tank sealing valves of humidifiers known to inventors on the market mostly adopt a sealing mode in which a spring force is used to drive a valve core assembly to move, a spring tension is used to make a valve body tightly press a bracket to achieve the aim of sealing, the sealing mode completely depends on the spring force, and if the spring fails, the sealing mode fails.

Moreover, the spring force provided by the spring is fixed, and force required for turning a valve on cannot be adjusted.

SUMMARY

In view of this, some embodiments of the disclosure provide a water outlet valve assembly capable of avoiding the failure of a pre-tightening force, and a humidifier including the water outlet valve assembly.

In some embodiments of the disclosure, a water outlet valve assembly is provided, which is disposed at a water outlet of a water tank and includes a body and a pressure limiting portion. The body includes a housing and a valve core assembly, a flow passage is formed in the housing, and the valve core assembly is capable of blocking the flow passage.

The pressure limiting portion is disposed on the valve core assembly and applies a weight of the pressure limiting portion to the valve core assembly, and the pressure limiting portion provides the valve core assembly with a downward pre-tightening force, thus allowing the valve core assembly to block the flow passage.

In some embodiments, the flow passage is configured in a tubular structure, a part of the valve core assembly is located in the flow passage and is moveable along an axial direction of the flow passage, and the valve core assembly has a first position that blocks the flow passage.

In some embodiments, the valve core assembly includes a valve core and a sealing portion, the valve core is configured in a rod-shaped structure, and a partial structure of the valve core is located in the flow passage, the sealing portion is configured in a disc-shaped or platform-shaped structure, a mounting hole is provided on the sealing portion, the sealing portion is connected with a position close to a first end on the valve core through the mounting hole, and the sealing portion is capable of blocking the flow passage.

In some embodiments, a limiting slot is formed on the pressure limiting portion, and the first end of the valve core extends into the limiting slot to limit the pressure limiting portion.

In some embodiments, the first end of the valve core is detachably connected with the limiting slot.

In some embodiments, the water outlet valve assembly includes a groove provided on the pressure limiting portion, the limiting slot is provided on a bottom wall of the groove, and the sealing portion extends into the groove.

In some embodiments, the sealing portion is in interference fit with a groove wall of the groove.

In some embodiments, an inner diameter of the groove is greater than an outer diameter of the flow passage, and an end portion of the flow passage extends into the groove at least at the first position.

In some embodiments, there are a plurality of pressure limiting portions with different weights, and at least one of the plurality of pressure limiting portions is selected to be disposed on the valve core assembly in use.

In some embodiments of the disclosure, a humidifier is provided, which includes a water tank and a base. The above water outlet valve assembly is disposed at the water outlet of the water tank.

The water outlet valve assembly provided by some embodiments of the disclosure provides a pre-tightening force to the valve core assembly through the pressure limiting portion to block the flow passage, thereby improving the reliability of blocking and avoiding the problem of failure or insufficiency of the pre-tightening force.

BRIEF DESCRIPTION OF THE DRAWINGS

The above and other objectives, features and advantages of the disclosure will be clearer through the following description of the embodiments of the disclosure with reference to the drawings. In the drawings.

DETAILED DESCRIPTION OF THE EMBODIMENTS

The following describes the disclosure based on the embodiments, but the disclosure is not limited to these embodiments. Those of ordinary skill in the art should understand that the drawings provided herein are for illustrative purposes, and the drawings are not necessarily drawn to scale.

Unless the context clearly requires, the words "including", "containing" and the like in the entire specification and claims should be interpreted as the meaning of inclusive rather than exclusive or exhaustive meaning, that is, "including but not limited to" meaning.

In the description of the disclosure, it should be understood that the terms "first", "second", etc. are for descriptive purposes only, and cannot be understood as indicating or implying relative importance. In addition, in the description of the disclosure, unless otherwise stated, the meaning of "multiple" is two or more.

The water outlet valve assembly provided by the disclosure is disposed at a water outlet of a water tank, is configured to control the water comes out of the water tank, and is particularly suitable for electrical equipment such as humidifiers.

Figure 1:
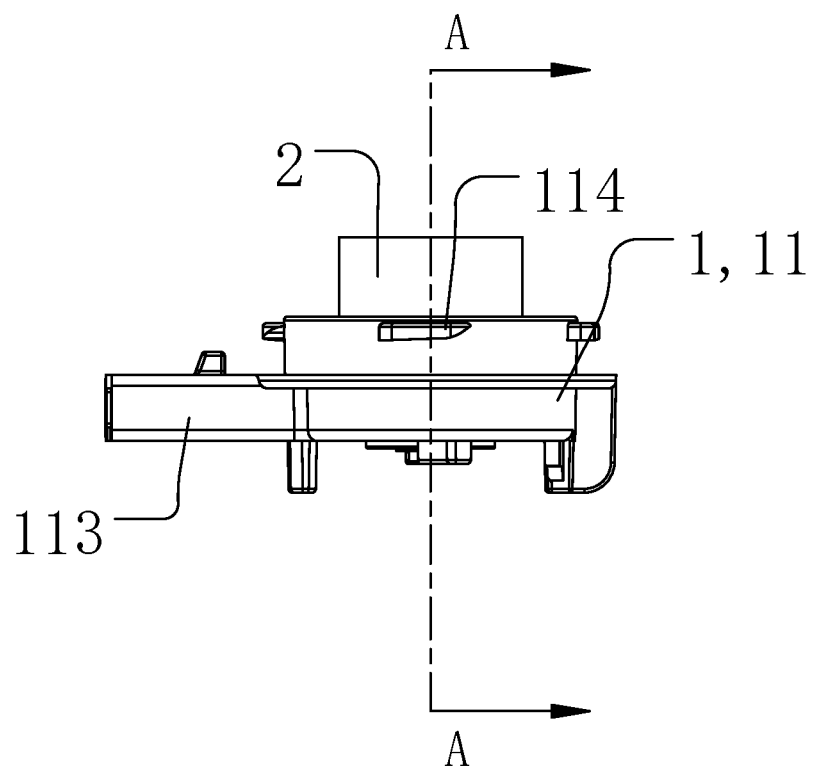
FIG. 1 shows a schematic structure diagram of a water outlet valve assembly according to an embodiment of the disclosure.
Figure 2:
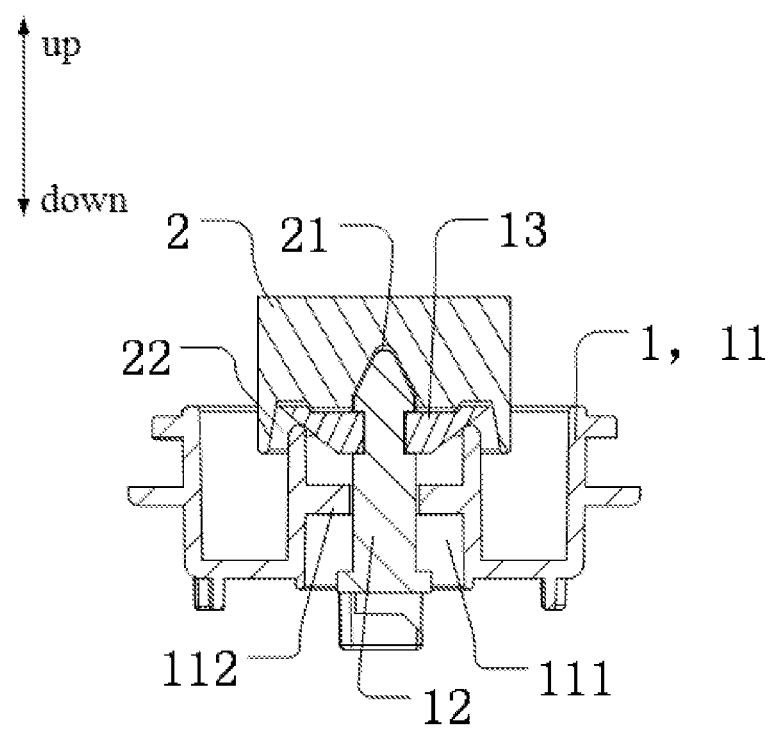
FIG. 2 shows a cross-sectional schematic diagram of part A-A in FIG. 1.

As shown in FIG. 1 and FIG. 2, the water outlet valve assembly provided by some embodiments of the disclosure includes a body 1 and a pressure limiting portion 2. The body 1 includes a valve core assembly. The pressure limiting portion 2 is disposed on the valve core assembly and provides pressure to the valve core assembly through a weight of itself.

In some embodiments, the body 1 includes a housing 11. The housing 11 is generally configured in a cylindrical structure. A flow passage 111 is provided on a radially inner side of the housing 11. In some embodiments, the flow passage 111 is a passage with a tubular structure. The flow passage 111 extends along an axial direction of the housing 11 and penetrates the housing 11 in the axial direction.

The body 1 further includes a valve core assembly, and at least part of the valve core assembly is movably disposed in the flow passage 111. The valve core assembly includes a valve core 12 and a sealing portion 13. The valve core 12 is configured in a rod-shaped structure and is slidably inserted into the flow passage 111 along an axial direction of the flow passage 111. The size of the valve core 12 in a radial direction is smaller than the size of the flow passage 111 in a radial direction, so that a gap is formed between the valve core 12 and an inner wall of the flow passage 111 to allow water to flow through the flow passage 111. The sealing portion 13 is configured in a disc-shaped or platform-shaped structure, and the size of an end surface of the sealing portion 13 is larger than the size of an end portion of the flow passage 111, so that the sealing portion 13 blocks the end portion of the flow passage 111. A mounting hole is provided on the sealing portion 13, the sealing portion 13 is fixedly mounted to the valve core 12 through the mounting hole, the sealing portion 13 is connected to a position close to a first end of the valve core 12, and in an axial direction of the valve core 12, the sealing portion 13 cannot move relative to the valve core 12. A mounting slot is disposed on a position, close to the first end, of the valve core 12, the mounting slot is disposed along the axial direction of the valve core 12, and a diameter of the mounting hole on the sealing portion 13 is smaller than an outer diameter of the valve core 12 and smaller or larger than an outer diameter of the surface where a bottom wall of the mounting slot is located, so that the mounting slot cooperates with the mounting hole to achieve clamping, the sealing portion 13 is limited in the axial direction of the valve core 12, and the mounting slot is in sealed contact with the mounting hole. In some embodiments, the sealing portion 13 is made of a soft material such as rubber. In some embodiments, a tapered surface is formed between a first end of the valve core 12 and the mounting slot, and the tapered surface guides the mounting of the sealing portion 13 to facilitate the mounting of the sealing portion 13.

A second end of the valve core 12 is inserted into the flow passage 111 from a first end of the flow passage 111 and is moved downwards. When the valve core 12 moves to a first position, the sealing portion 13 is in contact with the first end of the flow passage 111, the valve core 12 does not continue to slide downwards, and the sealing portion 13 is pressed against the first end of the flow passage 111 to block the first end of the flow passage 111. In some embodiments of the disclosure, in the first position, the first end of the valve core 12 is located outside the flow passage 111. The second end of the valve core 12 is close to the second end of the flow passage 111, or, the second end of the valve core 12 extends to the outside of the flow passage 111. Along the axial direction of the valve core 12, applying an upward thrust to the second end of the valve core 12, the valve core 12 drives the sealing portion 13 to move upwards, thereby opening the flow passage 111. After the pressure is removed, the valve core 12 and the sealing portion 13 move downwards to the first position, and the sealing portion 13 blocks the flow passage 111.

In some embodiments of the disclosure, a guide structure 112 is disposed in the flow passage 111, the guide structure 112 supports and guides the sliding of the valve core 12, and in order to avoid the guide structure 112 from affecting the water flow, a structure allowing water to pass through is formed on the guide structure. For example, the guide structure 112 is provided as a plate structure, an outer edge of the plate structure is connected with an inner wall of the flow passage 111, the plate structure is provided with a guide hole, the valve core 12 passes through the guide hole and slides along the axial direction, and the plate structure is provided with a water hole for water circulation. Or, the guide structure 112 includes a guide ring that cooperates with the valve core 12, the guide ring is connected with the inner wall of the flow passage 111 through connecting ribs, there are a plurality of connecting ribs, and a gap is formed between the plurality of connecting ribs for water circulation.

The pressure limiting portion 2 provides a downward force to the valve core 12, so that in a natural state, the sealing portion 13 is pressed against the first end of the flow passage 111 and closes the first end of the flow passage 111. In some embodiments, the pressure limiting portion 2 is disposed at the first end of the valve core 12 to provide thrust to the valve core 12. In some embodiments, the pressure limiting portion 2 is configured in a block structure. For example, in some embodiments, the pressure limiting portion 2 is configured in a cylindrical block structure, a limiting hole 21 is formed on a first end surface of the pressure limiting portion 2, the limiting hole 21 is configured as a blind hole, and during mounting, the first end of the valve core 12 extends into the limiting hole 21, so that the pressure limiting portion 2 does not move in the radial direction. In some embodiments, the limiting hole 21 is in interference fit with the first end of the valve core 12, or they are connected in a detachable manner such as clamping, so that the pressure limiting portion 2 does not fall off from the valve core 12.

In some embodiments of the disclosure, the water outlet valve assembly includes a groove 22 provided on a first end surface of the pressure limiting portion 2, and at this time, the limiting hole 21 is formed on a bottom surface of the groove 22. When the groove 22 is provided, after the pressure limiting portion 2 is mounted, the sealing portion 13 is located in the groove 22. In some embodiments of the disclosure, a side wall of the groove 22 is in interference fit with the sealing portion 13 to improve the mounting reliability of the pressure limiting portion 2.

In some embodiments of the disclosure, when the valve core 12 is in the first position, that is, when the sealing portion 13 blocks the flow passage 111, the first end of the flow passage 111 extends into the groove 22. Or, when the valve core 12 drives the sealing portion 13 and the pressure limiting portion 2 to move upwards a certain distance to separate the sealing portion 13 from the flow passage 111, the first end of the flow passage 111 is still located in the groove 22 so that water flows into the flow passage 111 through the gap between the groove 22 and an outer wall of the flow passage 111. The inner wall of the groove 22 cooperates with the outer wall of the flow passage 111 to further limit the movement of the limiting portion 2 in the radial direction, thereby avoiding influence on the mounting reliability caused by relatively large displacement in the radial direction. In some embodiments of the disclosure, a radial dimension of the side wall of the groove 22 close to the first end of the pressure limiting portion 2 is greater than a radial dimension of the part close to a bottom wall of the groove 22, so that after the pressure limiting portion 2 moves upwards, the gap between the inner wall and the flow passage 111 is larger, which is more conducive to water circulation. Further, the side wall of the groove 22 is configured as a part of the tapered surface.

In some embodiments of the disclosure, the water outlet valve assembly includes a plurality of pressure limiting portions 2, the weights of the plurality of pressure limiting portions 2 are different, and the pressure limiting portion 2 of a suitable weight is selected as needed to enable the valve core 12 to obtain sufficient pre-tightening force, so as to ensure the reliability of the sealing portion 13 to block the flow passage 111. The thrust required to open the sealing portion 13 is adjusted so that the water outlet valve assembly is applied to more equipment.

As shown in FIG. 1, in some embodiments, the housing 11 is also provided with a water outlet flow passage 113, the water outlet flow passage 113 is communicated with the flow passage 111, and water flows from the first end of the flow passage 111 and flows out from the water outlet flow passage 113. In some embodiments, a blocking structure (not shown in the figure) is further provided on the housing 11, the blocking structure blocks the second end of the flow passage 111, and the blocking structure is deformed so as to be able to apply thrust to the valve core 12 through the blocking structure. In some embodiments, the blocking structure is connected to the housing 11 in a detachable manner.

In some embodiments of the disclosure, an upper end side wall of the housing 11 is provided with a clamping portion 114, and a plurality of clamping portions 114 are arranged at intervals along a circumferential direction of the housing 11. The clamping portion 114 is configured as a raised structure formed on the side wall of the housing 11. The clamping portion 114 enables the housing 11 to be rotationally clamped with the water outlet of the water tank. In some embodiments, a sealing member is provided at the connection between the housing 11 and the water tank to seal the connection.

Some embodiments of the disclosure also provide a humidifier, which includes a water tank and a base. A water outlet valve structure is disposed at a water outlet of the water tank. Water is injected into the water tank through the opening and closing control of the water outlet valve structure.

The water outlet valve assembly provided by some embodiments of the disclosure provides a pre-tightening force to the valve core assembly through the pressure limiting portion to block the flow passage, thereby improving the reliability of blocking and avoiding the problem of failure or insufficiency of the pre-tightening force. On the other hand, the arrangement of the pressure limiting portion makes water provide a certain pressure to the pressure limiting portion, thereby further increasing the pre-tightening force and further improving the reliability of blocking.

Those skilled in the art easily understand that the above solutions can be freely combined and superimposed on the premise of no conflict.

It should be understood that the above implementation manners are only exemplary rather than limiting, without departing from the basic principles of the disclosure. Those skilled in the art can make various obvious or equivalent modifications or replacements for the above details, which will be included within the scope of the claims of the disclosure.

What is claimed is:

1. A water outlet valve assembly, disposed at a water outlet of a water tank and comprising a body and a pressure limiting portion, wherein the body comprises a housing and a valve core assembly, a flow passage is formed in the housing, the valve core assembly is capable of blocking the flow passage,
   the pressure limiting portion is disposed on the valve core assembly and applies a weight of the pressure limiting portion to the valve core assembly, and the pressure limiting portion provides the valve core assembly with a downward pre-tightening force, thus allowing the valve core assembly to block the flow passage;
   wherein the valve core assembly comprises a valve core and a sealing portion,
   the valve core is configured in a rod-shaped structure, a partial structure of the valve core is located in the flow passage,
   the sealing portion is configured in a disc-shaped or platform-shaped structure, a mounting hole is provided on the sealing portion, the sealing portion is mounted on the valve core fixedly through the mounting hole, and the sealing portion is capable of blocking the flow passage;
   a limiting slot is formed on the pressure limiting portion, and a first end of the valve core extends into the limiting slot to limit the pressure limiting portion.

2. The water outlet valve assembly according to claim 1, wherein the flow passage is configured in a tubular structure, a part of the valve core assembly is located in the flow passage and is moveable along an axial direction of the flow passage, and the valve core assembly has a first position that blocks the flow passage.

3. The water outlet valve assembly according to claim 1, wherein the first end of the valve core is detachably connected with the limiting slot.

4. The water outlet valve assembly according to claim 1, wherein the water outlet valve assembly comprises a groove provided on the pressure limiting portion, the limiting slot is provided on a bottom wall of the groove, and the sealing portion extends into the groove.

5. The water outlet valve assembly according to claim 4, wherein the sealing portion is in interference fit with a groove wall of the groove.

6. The water outlet valve assembly according to claim 4, wherein an inner diameter of the groove is greater than an outer diameter of the flow passage, and an end portion of the flow passage extends into the groove at least at the first position.

7. The water outlet valve assembly according to claim 1, wherein there are a plurality of pressure limiting portions with different weights, and at least one of the plurality of pressure limiting portions is selected to be disposed on the valve core assembly in use.

8. A humidifier, comprising a water tank and a base, wherein the water outlet valve assembly according to claim 1 is disposed at the water outlet of the water tank.

9. The humidifier according to claim 8, wherein the flow passage is configured in a tubular structure, a part of the valve core assembly is located in the flow passage and is moveable along an axial direction of the flow passage, and the valve core assembly has a first position that blocks the flow passage.

10. The humidifier according to claim 9, wherein the valve core assembly comprises a valve core and a sealing portion,
   the valve core is configured in a rod-shaped structure, a partial structure of the valve core is located in the flow passage,
   the sealing portion is configured in a disc-shaped or platform-shaped structure, a mounting hole is provided on the sealing portion, the sealing portion is connected with a position close to a first end on the valve core through the mounting hole, and the sealing portion is capable of blocking the flow passage.

11. The humidifier according to claim 10, wherein the water outlet valve assembly comprises a groove provided on the pressure limiting portion, the limiting slot is provided on a bottom wall of the groove, and the sealing portion extends into the groove.

12. The humidifier according to claim 11, wherein the sealing portion is in interference fit with a groove wall of the groove.

13. The humidifier according to claim 11, wherein an inner diameter of the groove is greater than an outer diameter of the flow passage, and an end portion of the flow passage extends into the groove at least at the first position.

14. The humidifier according to claim 8, wherein there are a plurality of pressure limiting portions with different weights, and at least one of the plurality of pressure limiting portions is selected to be disposed on the valve core assembly in use.

* * * * *